Figure 3:
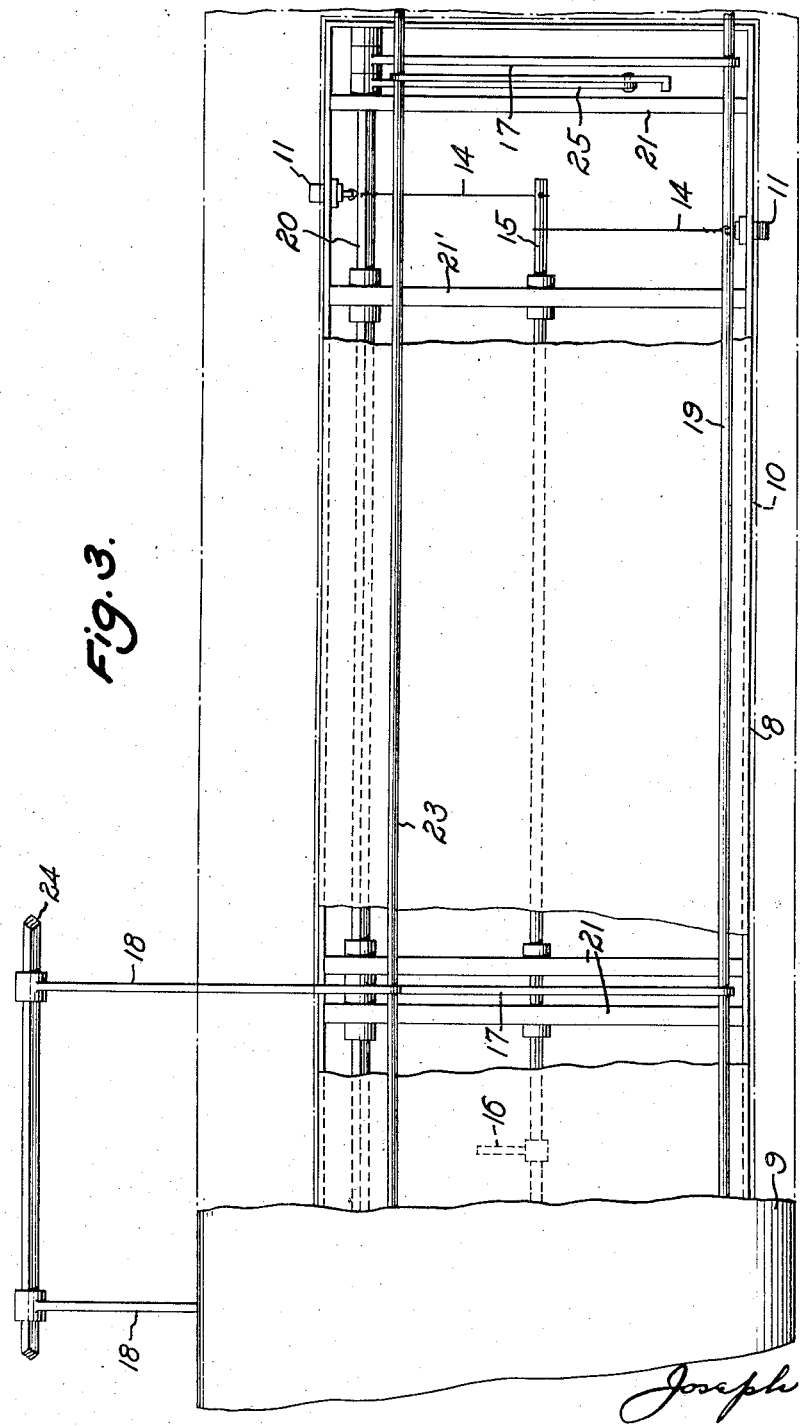

Feb. 28, 1939.   J. POTOCZEK   2,148,962
AIRPLANE WING CONSTRUCTION
Filed Sept. 13, 1937   2 Sheets-Sheet 1
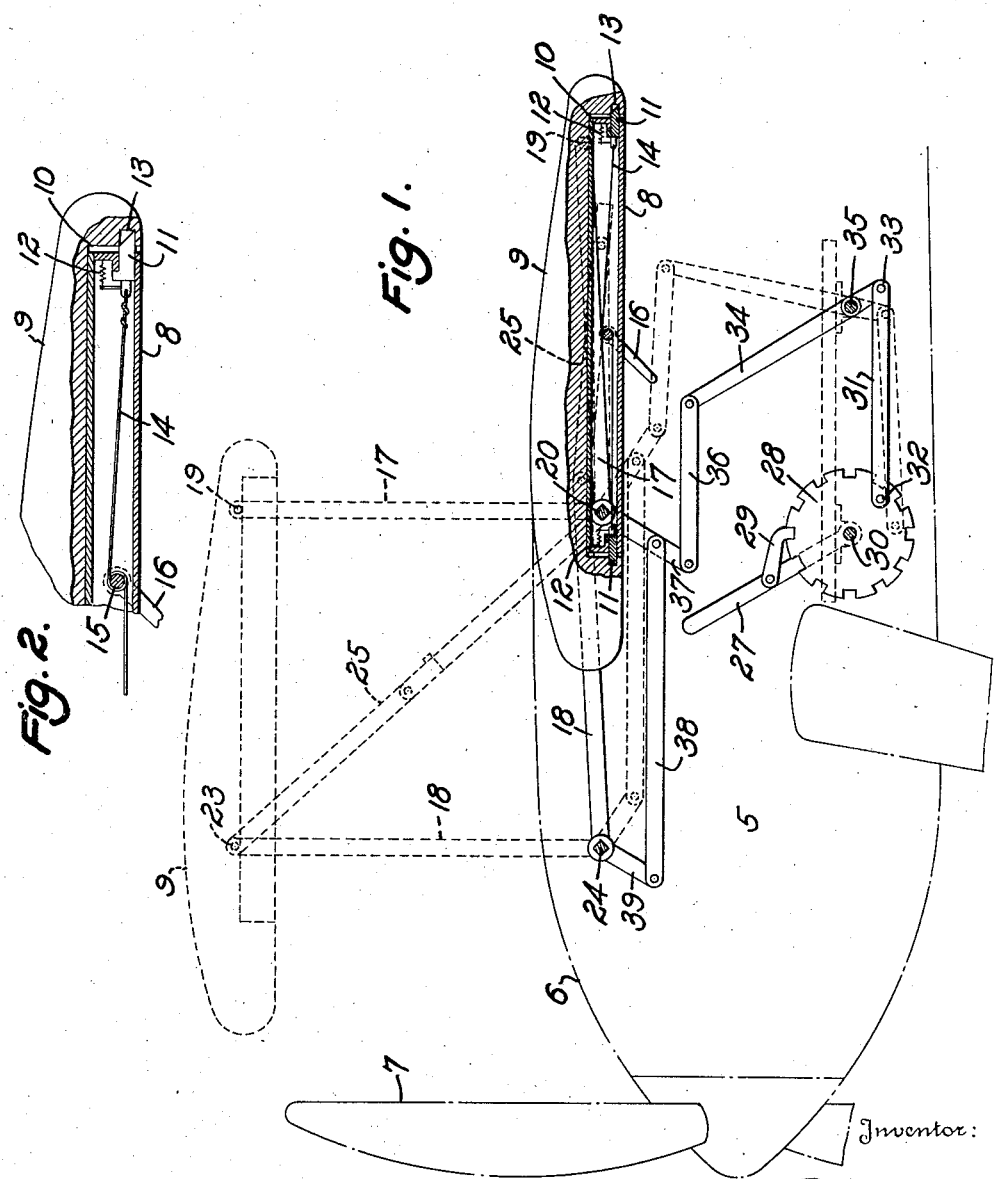
Inventor:
Joseph Potoczek,
By Potter, Pierce & Scheffler,
Attorneys.

Feb. 28, 1939.  J. POTOCZEK  2,148,962
AIRPLANE WING CONSTRUCTION
Filed Sept. 13, 1937  2 Sheets—Sheet 2

Inventor:
Joseph Potoczek,
By Potter, Pierce & Scheffler,
Attorneys.

Patented Feb. 28, 1939

2,148,962

UNITED STATES PATENT OFFICE 2,148,962

AIRPLANE WING CONSTRUCTION

Joseph Potoczek, Chicago, Ill.

Application September 13, 1937, Serial No. 163,703

8 Claims. (Cl. 244—43)

The present invention relates to airplanes and particularly to an improved wing construction therefor.

An object of the invention is to provide an improved wing construction whereby the effective wing area may be materially increased during flight.

In the past, many proposals have been made dealing with means of increasing the wing area of airplanes under control of the pilot. In such prior devices the auxiliary wing surface was either raised above or suspended below the main wing so that the expected added lifting force was not realized due to the blanketing effect of the uppermost wing member on the lower wing member.

It is an object of the present invention to provide a wing construction involving vertically and laterally separable wing elements which normally form the single wing element of a monoplane but which may be separated under control of the pilot so as to increase the effective lifting area of the wing.

It is also an object to provide such a wing construction in which the movable wing member is moved to a position which will cause a shift in the center of gravity of the airplane so as to reduce the tendency to "nose over" when landing and particularly when making a forced landing due to motor failure.

The objects of the invention are realized by providing a movable wing element which is mounted on a suitable linkage mechanism so that it may be shifted upwardly and forwardly from its normal position, leaving exposed an auxiliary stationary wing member which is normally housed within a cavity in the under surface of the movable wing member. By mounting the main movable wing member for both upward and forward movement, it will be shifted clear of the auxiliary wing so as not to blanket and thus detract from the lifting effect of the latter.

Other objects and advantages of the invention will become apparent upon reference to the following detailed description and the accompanying drawings illustrating a preferred embodiment of the invention.

In the drawings

Fig. 1 is a side elevation with parts in section illustrating an embodiment of the invention, Fig. 2 is a detail sectional view illustrating the means of fastening the wing sections together, and Fig. 3 is a plan view with parts broken away illustrating the wing operating mechanism.

The drawings illustrate the invention schematically and it will be understood that the ultimate design of details may be modified to conform to accepted aerodynamic practice.

Referring now more particularly to the details of construction of the invention, 5 indicates the body portion or fuselage of an airplane. The fuselage may be of conventional construction, having the usual motor mounted in the nose 6 for driving the propeler 7.

The sustaining surface of the airplane is provided by two wing members 8 and 9 which are normaly nested together with the wing 9 superimposed on the wing 8 to provide a single wing. The wing member 8 which is rigidly secured to the fuselage in approved manner is in reality the auxiliary wing when the two wings are separated.

The wing member 9 is larger than the wing member 8 and is provided with a cavity 10 in its under surface into which the wing member 8 fits when the wings are in normal nested relation as shown in full lines in Fig. 1 and also in Fig. 2. The cavity 10 is of a depth to just receive the wing 8 in its entirety so that the lower surfaces of the wings lie flush forming a continuous surface when in the normal position.

The wing sections are secured in nested relation by a plurality of locking bolts 11 which are held in projected position by springs 12. The bolts 11 are carried by the wing member 8 and engage in detents 13 in the walls of the cavity in the wing 9. As many of these locking bolts are provided as desired to securely lock the two wings together, there being several along both the leading and trailing edge of the wing 8. The locking bolts are retracted when desired by flexible draw members 14 which extend between the bolts 11 and a rock shaft 15 which is journalled within the wing 8 and extends longitudinally thereof. This rock shaft 15 is operated by a handle 16 or may be motor driven if desired. It will be seen that upon turning the rock shaft, the flexible draw members 14 will be wound thereon to retract the bolts 11 against the tension of the springs 12.

The member 9 is mounted on a plurality of struts or links 17 and 18. The struts 17 are pivotally connected at their upper ends to the wing 9 adjacent the trailing edge thereof. A preferred way of effecting this connection is to provide a rod 19 which is mounted within the wing 9 and which extends longitudinally thereof adjacent the trailing edge of the wing, this rod extending through openings in the upper ends of the struts 17.

The lower ends of the struts 17 are rigidly mounted on a squared shaft 20 which is journalled in the frame members 21 and 21' of the rigid wing 8 adjacent the leading edge thereof.

The struts or links 18, of which there are preferably two in number, are pivoted at their upper ends to the wing 9 adjacent the leading edge thereof as indicated in Fig. 1. The connection of the struts 18 to the wing 9 is likewise effected by a rod 23 mounted in the wing longitudinally thereof adjacent the leading edge and passing through openings in the upper ends of the struts 18.

The lower ends of the struts 18 are rigidly mounted on a squared shaft 24 which is journalled in the fuselage forwardly of the rigid wing 8 and spaced from the bar 20 a distance equal to the spacing of the rods 19 and 23 so that the struts 17 and 18 form a parallel linkage mechanism which will retain the wing sections 8 and 9 always in parallel relation regardless of the respective positions which they may occupy.

Although there may be any number of struts or links 17 provided as desired, I prefer to use four, placing one on each side of the fuselage and one adjacent each end of the rigid wing 8. As stated above, there are preferably only two forward struts 18, placed one on each side of the fuselage since it is impractical to extend the shaft 24 very far beyond the fuselage. For the purpose of bracing the leading edge of the upper wing 9 when in elevated position, two folding end braces 25 are provided, one adjacent each end of the rigid wing 8. One arm of each of the braces 25 is journalled on the rock shaft 20, the free end of the other arm being journalled on the rod 23. The braces 25, in addition to supplementing the struts 18, serve to limit the forward movement of the wing 9. Suitable channels are provided in the wing members to accommodate the members 17, 18 and 25 when the wings are in nested relation. The channels may be provided in any suitable manner as by omitting the wing covering between the frame members 21.

The linkage for elevating the wing 9 is operated by a hand lever 27 which turns a ratchet wheel 28 through the medium of a dog 29. The ratchet wheel 28 is journalled on a pivot 30 in the floor of the fuselage and a link 31 is connected thereto by means of crank pin 32. The link 31 is pivotally connected at 33 to the lower end of a lever 34 which is mounted on a stationary pivot 35 mounted in the fuselage. The upper end of the lever 34 is connected by a link 36 to a crank arm 37 which is rigidly secured to the squared shaft 20. A drag link 38 connects the crank arm 37 and a crank arm 39 rigidly carried by the squared shaft 24 so that the shafts 20 and 24 will be caused to turn in unison.

From the foregoing, the operation is believed to be obvious but will be briefly stated. When, due to motor failure or any other reason, it is desired to increase the wing area, the lever 16 is moved to rock the shaft 15 and retract the bolts 11. The lever 27 is then pulled to the right as viewed in Fig. 1. This will result in simultaneous rotation of the squared shafts 20 and 24 in a counter-clockwise direction so as to swing the struts 17 and 18 to an upright position thus elevating the wing member 9 and exposing wing member 8. Movement of the lever 27 in the opposite direction will result in retraction of the wing 9 to full line position.

When the wing 9 is moved to elevated position, it is to be noted that it occupies a position forwardly offset from the rigid wing 8 so that it does not produce a blanketing effect which would result if it were directly above the lower wing. It is further to be noted that the wing 9 assumes a position over the nose of the fuselage, thereby effecting a shift in the center of gravity of the plane when in flight and reducing the possibility of the ship going into a nose dive if the engine is dead. Thus, due to the ample wing area and position of the wing 9 when elevated, forced landings may be made with comparative ease and safety.

While a preferred embodiment of the invention has been shown and described for purposes of illustration, it is to be understood that various modifications and changes in the details of construction may be resorted to without departing from the spirit of the invention within the scope of the appended claims.

I claim:

1. In an airplane, a fuselage, a pair of nested wing members normally forming a single wing unit, one of said wing members being rigidly secured to said fuselage, the other of said wing members being linked to said fuselage at a point forwardly of the leading edge of said rigidly mounted wing member and shiftable to a position above and out of registry with the rigidly mounted member.

2. In an airplane, a fuselage, a stationary wing member secured to said fuselage, a movable wing member normally disposed in nested relation upon said stationary wing member, and a parallel linkage mechanism for swinging said movable wing member to a projected position spaced above and forwardly out of registry with said stationary wing member, said parallel linkage mechanism including a pair of link members connected at their upper ends to said movable wing member and at their lower ends to said fuselage at a point in advance of the leading edge of said stationary wing member.

3. In an airplane, a fuselage, a stationary wing member, a movable wing member, and a parallel linkage connection between said movable wing and said stationary wing and between said movable wing and said fuselage, said linkage mechanism comprising front and rear link members, the rear link members being connected at their lower ends to the stationary wing adjacent the leading edge thereof and at their upper ends to the movable wing adjacent the trailing edge thereof and the front link members being connected at their lower ends to the fuselage at a point forwardly of the stationary wing and at their upper ends to the movable wing.

4. In an airplane, a fuselage, a stationary wing member, a movable wing member normally disposed in nested relation over said stationary wing member to form a single wing unit, a rock shaft mounted in the stationary wing member adjacent the leading edge thereof, a second rock shaft mounted transversely on said fuselage spaced forwardly of said stationary wing, link members carried by said first mentioned rock shaft and pivotally connected to said movable wing member adjacent the trailing edge thereof, link members carried by the second mentioned rock shaft and pivotally connected to said movable wing member forwardly of the first mentioned link members, and means for rocking said shafts in unison to raise said movable wing on said links to a position spaced above and forwardly of said stationary wing member.

5. In an airplane, a fuselage, a stationary wing member mounted on said fuselage, a movable wing member having a recess in its under face for housing said stationary wing member, and means for moving said movable wing member to and from nested relation with said stationary wing to a position spaced above and forwardly of the latter comprising a parallel linkage connection between said movable wing and said stationary wing and between said movable wing and said fuselage, said linkage mechanism comprising front and rear link members, the rear link members being connected at their lower ends to the stationary wing adjacent the leading edge thereof, and at their upper ends to the movable wing adjacent the trailing edge thereof and the front link members being connected at their lower ends to the fuselage at a point forwardly of the stationary wing and at their upper ends to the movable wing.

6. In an airplane, a fuselage, a stationary wing member, a movable wing member, a parallel linkage connection between said movable wing and said stationary wing and between said movable wing and said fuselage, said linkage mechanism comprising front and rear link members, the rear link members being connected at their lower ends to the stationary wing adjacent the leading edge thereof, and at their upper ends to the movable wing adjacent the trailing edge thereof and the front link members being connected at their lower ends to the fuselage at a point forwardly of the stationary wing and at their upper ends to the movable wing, and manually releasable means independent of said linkage mechanism for locking said wing members in nested relation.

7. In an airplane, a fuselage, a stationary wing member, a movable wing member normally disposed in nested relation over said stationary wing member to form a single wing unit, a rock shaft mounted in the stationary wing member adjacent the leading edge thereof, a second rock shaft mounted transversely on said fuselage spaced forwardly of said stationary wing, link members carried by said first mentioned rock shaft and pivotally connected to said movable wing member adjacent the trailing edge thereof, link members carried by the second mentioned rock shaft and pivotally connected to said movable wing member, and means for rocking said shafts in unison to raise said movable wing on said links to a position spaced above and forwardly of said stationary wing member, and manually releasable means independent of said linkage mechanism for locking said wing members in nested relation.

8. In an airplane, a fuselage, a stationary wing member mounted on said fuselage, a movable wing member having a recess in its under face for housing said stationary wing member, means for moving said movable wing member to and from nested relation with said stationary wing to a position spaced above and forwardly of the latter comprising a parallel linkage connection between said movable wing and said stationary wing and between said movable wing and said fuselage, said linkage mechanism comprising front and rear link members, the rear link members being connected at their lower ends to the stationary wing adjacent the leading edge thereof, and at their upper ends to the movable wing adjacent the trailing edge thereof and the front link members being connected at their lower and upper ends to the fuselage at a point forwardly of the stationary wing and to the movable wing respectively, and manually releasable means independent of said linkage mechanism for locking said wing members in nested relation.

JOSEPH POTOCZEK.